（12）United States Patent
Sazan (10) Patent No.: US 11,205,211 B2
(45) Date of Patent: Dec. 21, 2021

(54) ARTIFICIAL INTELLIGENCE SYSTEM FOR IMAGE ANALYSIS AND ITEM SELECTION

(71) Applicant: David Sazan, Paramus, NJ (US)

(72) Inventor: David Sazan, Paramus, NJ (US)

( * ) Notice: Subject to any disclaimer, the term of this patent is extended or adjusted under 35 U.S.C. 154(b) by 160 days.

(21) Appl. No.: 16/398,545

(22) Filed: Apr. 30, 2019

(65) Prior Publication Data

US 2020/0349628 A1    Nov. 5, 2020

(51) Int. Cl.
    *G06Q 30/06*    (2012.01)
    *G06T 7/73*     (2017.01)
    *G06T 7/13*     (2017.01)
    *G06F 3/0484*   (2013.01)

(52) U.S. Cl.
    CPC ....... *G06Q 30/0631* (2013.01); *G06F 3/0484* (2013.01); *G06Q 30/0625* (2013.01); *G06T 7/13* (2017.01); *G06T 7/73* (2017.01); *G06T 2207/10016* (2013.01); *G06T 2207/30196* (2013.01)

(58) Field of Classification Search
    CPC ........ G06Q 30/0601–0643; G06T 7/13; G06T 2207/10016; G06T 2207/30196
    See application file for complete search history.

(56) References Cited

U.S. PATENT DOCUMENTS

| | | | |
|---|---|---|---|
| 9,881,226 B1 | 1/2018 | Rybakov et al. | |
| 10,248,991 B1* | 4/2019 | Cheung | G06Q 30/0643 |
| 10,282,720 B1* | 5/2019 | Buibas | G06K 9/00201 |
| 2004/0111332 A1* | 6/2004 | Baar | G09G 5/00 |
| | | | 705/50 |
| 2010/0058397 A1* | 3/2010 | Rogers | H04N 21/242 |
| | | | 725/60 |
| 2013/0083999 A1* | 4/2013 | Bhardwaj | G06K 9/4652 |
| | | | 382/165 |
| 2013/0166382 A1 | 6/2013 | Cassidy et al. | |
| 2014/0279246 A1* | 9/2014 | Chen | G06F 16/58 |
| | | | 705/26.61 |
| 2015/0120507 A1 | 4/2015 | Chan et al. | |
| 2015/0245103 A1* | 8/2015 | Conte | G06Q 30/0643 |
| | | | 725/60 |
| 2018/0182016 A1* | 6/2018 | Giampaolo | G06Q 30/0641 |
| 2019/0318405 A1* | 10/2019 | Hu | G06F 16/55 |

OTHER PUBLICATIONS

Liu, Rebecca. Is, It. "Fashion with." (2011).*

* cited by examiner

*Primary Examiner* — Resha Desai
(74) *Attorney, Agent, or Firm* — Weitzman Law Offices, LLC (57) ABSTRACT

A method of analyzing images by a computing device to generate an e-commerce interface, comprising receiving, from a computing device associated with a first human user, a list of items associated with the first human user; receiving, from a computing device associated with a merchant, purchasing information for each item of the list of items; receiving, from a second human user, one or more images depicting the first human user using one or more items from the list of items; automatically analyzing the one or more images to identify the one or more items; and generating a user interface comprising at least one of the one or more images, links to a computing system of the merchant from which the second human user may obtain the one or more items identified.

16 Claims, 7 Drawing Sheets

ARTIFICIAL INTELLIGENCE SYSTEM FOR IMAGE ANALYSIS AND ITEM SELECTION

FIELD OF INVENTION

This application relates to artificial intelligence methods for receiving and processing image data, and more specifically, for receiving images of articles of clothing, automatically identifying those articles, and providing user interfaces for interacting with the received images.

BACKGROUND

Many aspects of celebrities' lives are followed closely and emulated by their adoring fans. For example, paparazzi supply an endless stream of photographs to magazines that are eagerly purchased by those who want to see their favorite celebrity at an event or in everyday life. Commentators at red carpet events discuss in detail the fashions and designers being worn by many in attendance. Many fans would jump at the ability to emulate a favored celebrity even more closely by purchasing clothes, accessories, or other items that the celebrity has worn or used.

Despite the increasing prevalence of online shopping, targeted advertising, and interactive media/streaming/cable television services, it is still a common occurrence that a consumer might see an image or video of a celebrity with a particular article of clothing or accessory, desire to purchase the same item, and be unable to immediately proceed with purchase due to an information gap regarding how to obtain the item in question. The most concrete plan available may be to enter the celebrity's name and the name of the clothing article into a search engine and hope that someone has already identified the item with enough specificity to enable the consumer to find and purchase the item themselves.

SUMMARY OF THE INVENTION

An automated image analysis system is disclosed, comprising three computing devices. The first computing device comprises memory storing non-transitory instructions that when executed by a processor of the first computing device, cause the first computing device to record one or more items purchased by a first user and information regarding a merchant offering the one or more items for sale. The second computing device comprises memory storing non-transitory instructions that when executed by a processor of the second computing device, cause the second computing device to: receive, from the third computing device and directed by a second user, one or more images depicting the first user; automatically determine, based on visual characteristics of the one or more images, one or more items depicted in the one or more images are among the one or more items purchased by the first user; and automatically generate an augmented graphical user interface for display on the third computing device, comprising the one or more images and links which, when followed by the second user, will allow the second user to purchase the one or more items depicted in the one or more images from the merchant offering the one or more items for sale.

A method of analyzing images by a computing device to generate an e-commerce interface is disclosed, comprising receiving, from a computing device associated with a first human user, a list of items associated with the first human user; receiving, from a computing device associated with a merchant, purchasing information for each item of the list of items; receiving, from a second human user, one or more images depicting the first human user using one or more items from the list of items; automatically analyzing the one or more images to identify the one or more items; and generating a user interface comprising at least one of the one or more images, links to a computing system of the merchant from which the second human user may obtain the one or more items identified.

A method of generating an e-commerce interface based on image data input is disclosed, comprising: receiving, by a computing device, an image depicting a person using an unidentified item; automatically processing, by the computing device, the image to determine the presence of the unidentified item within the image; automatically determining, by the computing device, the identities of one or more commercially available items which visually correspond to the unidentified item and are potential identifications of the unidentified item; automatically generating an augmented graphical user interface that comprises the image, a visual highlighting of the unidentified item, an informational region that displays the one or more items determined to be potential identifications of the unidentified item, and a link within the informational region to an online store of a merchant from which one of the one or more items determined to the potential identifications of the unidentified item may be purchased.

DETAILED DESCRIPTION

In response to the consumer opportunity described above, the presently disclosed system performs up to three functions: building a database of clothing, accessories, or other items associated with a celebrity which is held in privacy so long as the celebrity has not actually worn or used the item in question publicly; analyzing an image or video accessible to a consumer in which the celebrity is wearing or using previously registered clothing, accessories, or items; and providing a means for the consumer to buy the same or similar clothing, accessories, or items for herself or himself.

Figure 1:
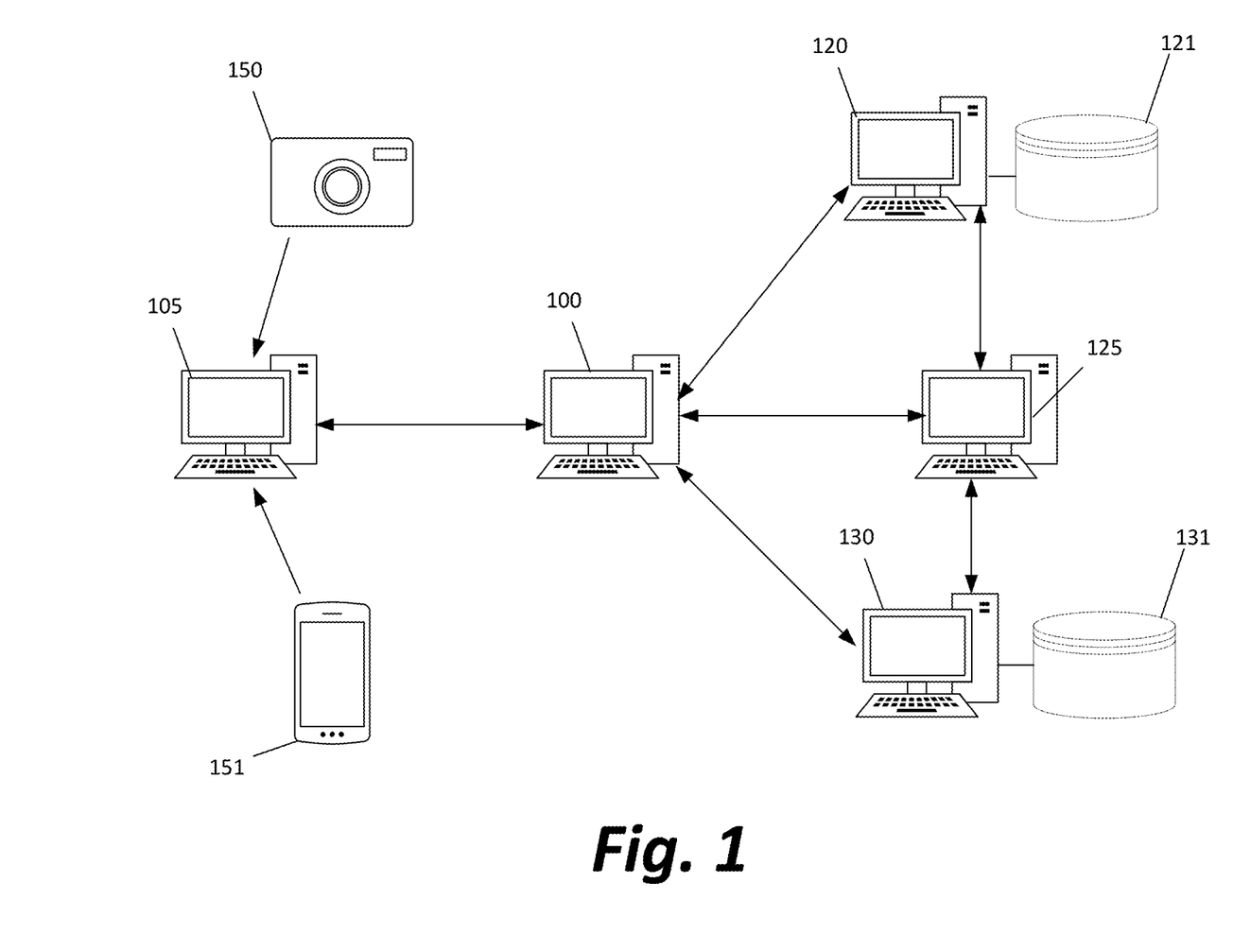
FIG. 1 depicts a system of computing devices working in concert to perform multiple methods according to the present disclosure.

FIG. 1 depicts a system of computing devices working in concert to perform these methods, which are described in greater detail below.

A central server 100 may be used to communicate with up to four distinct systems to which it is directly coupled or indirectly coupled (such as through the Internet or a network more generally): one or more celebrity administration computing devices 105, one or more merchant computing devices 120, one or more consumer computing devices 125, and one or more content delivery devices 130. Merchant computing device 120 and content delivery device 130 may themselves be coupled to external databases 121 and 131, storing data of interest to central server 100 and which central server 100 may access either directly through a network connection or through an application programming interface mediated by the devices 120 or 130.

Central server 100 may also communicate with a number of other devices used to gather data for processing, including, for example, a camera 150 or mobile phone or other computing device 151 associated with a celebrity.

Central server 100 may perform all functions related to all three methods described herein. In other embodiments, the functions of central server 100 may be divided between separate computing devices, so that central server 100 is actually a system of computing devices or of software modules executed by processors in different devices, sharing a database or other data storage so that later-performed methods may build from the results of previous methods.

In a preferred embodiment, celebrity administration computing device 105 may be a desktop computer or mobile phone running software configured to allow a celebrity or a person associated with the celebrity to enter information about purchases of that celebrity, to be provided to central server 100 as described below. Merchant computing device 120 may be a server that provides a website for purchasing items from a given merchant or other source of goods, or for querying a catalog of items associated with or available from a source of goods. Consumer computing devices 125 may be personal computers, mobile phones or other mobile computing devices, smart TVs capable of running custom applications and/or providing browser and network communication functionality, or any other device capable of displaying a graphical user interface and receiving user input. Content delivery devices 130 may be, for example, web servers or video streaming servers that store information in a visual form comprising one or more images (such as movies, television, other video streams, photo galleries, articles with photos, social media pages, etc.) and provide the information to consumer computing devices 125 on demand or as part of a subscription.

Figure 2:
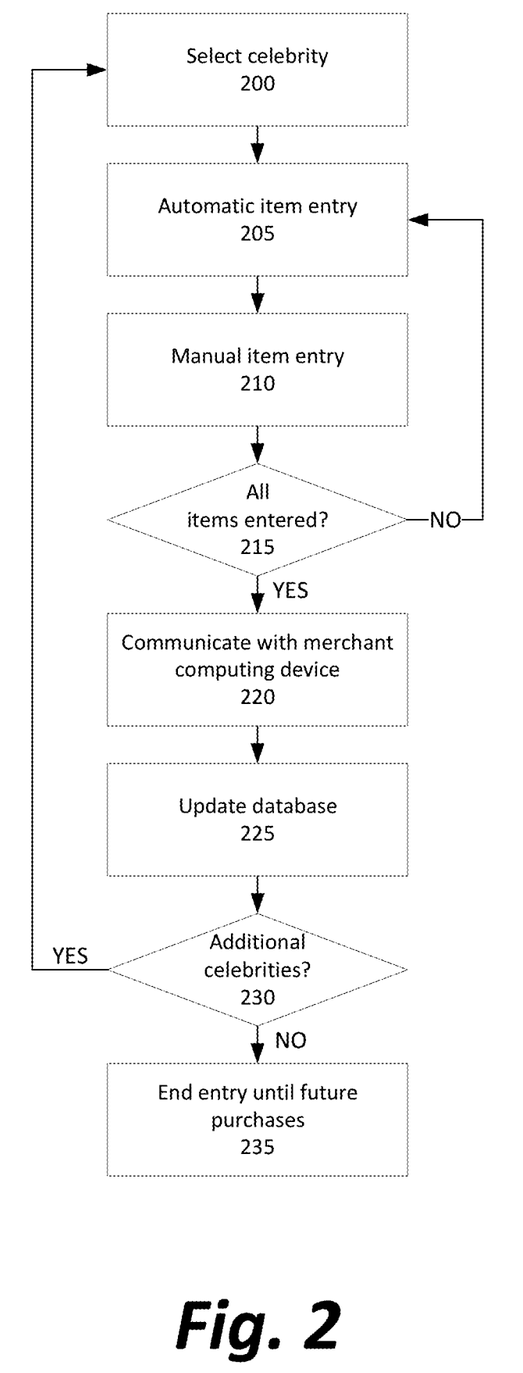
FIG. 2 depicts a method of entering clothing or accessory information associated with a celebrity into a database for later use.

FIG. 2 depicts a method of entering clothing or accessory information associated with a celebrity into a database for later use.

Initially, a user of celebrity admin computing device 105 may select a celebrity from a set of celebrities participating in and cooperating with the system (Step 200). If the celebrity is being enrolled in the system for the first time, a configuration process may be used to enter the celebrity's name and other information necessary to perform functions below.

The user of device 105 may cause automatic entry of one or more items that have been purchased or otherwise made available to a celebrity for use (Step 205).

Automatic entry may involve importing an image that indicates the identity of one or more items, such as an image of a printed sales receipt captured using a camera built into device 105 or in a device associated with device 105, such as an external camera 150 or a mobile computing device 151 that is communicatively coupled to device 105. The image of the receipt may then have text recognition used to identify the merchant source of the goods and the names or identifiers of items sold by the merchant.

Automatic entry may alternatively involve copying and pasting the contents of a sales receipt delivered via email or website, and similarly identifying items based on the merchant and names or identifiers of the sold items.

Automatic entry may alternatively involve scanning bar codes or universal product codes (UPCs) through camera 150 or mobile computing device 151 to look up the item based on the barcode/UPC. It may also involve taking a picture of the item itself and analyzing the image according to the method described further below in the discussion of FIG. 4.

Automatic entry may additionally or alternatively involve a celebrity providing access to software to access a website shopping cart, online shopping history, or other records of information available to the celebrity to update the database of the celebrity's purchases in real time at the moment of purchase, or by accessing historical purchases.

The user of celebrity admin computing device 105 may also manually enter one or more items (Step 210).

For example, the user may, knowing the merchant and/or other information about the item, select items from a merchant's provided catalog or another available listing of items and indicate that the celebrity now owns the item.

Alternatively, the information may be entered by hand, such as typing in each of the merchant's name, the item's name, and any unique identifiers for the item such as a model number.

If all items have been entered (Step 215), the information is then sent to the central server 100; in the alternative, the user may be prompted to manually enter or cause automatic entry of additional items (back to Step 205 or 210).

After receiving automatic or manual identifications of one or more items from the celebrity admin computing device 105, central server 100 may automatically communicate with the merchant computing device 120 or its associated database 121 (Step 220) to determine one or more qualities associated with each item associated with the celebrity clothing, including, for example, an item name (such as a particular brand name or model name), an item type (e.g., a dress, a shoe, a purse, a mobile phone, etc.), color(s) present in the item's design, matte or reflective qualities of the item, qualities of a fabric or material from which the item is made (such as a material's identity, translucency, or thickness or stiffness or lack thereof), any identifying marks, logos, or text on the item, a reference image or model of the item type, and these qualities may be entered into a database of central server 100 (Step 225).

The database record may also include, in some embodiments, additional information such as the date on which the item was obtained by the celebrity, and/or a reference image of the item that was used for automatic entry of the item.

If a single celebrity admin computing device 105 is being used to record data for multiple celebrities (for example, if it is used on a filming set to record items associated with multiple actors, or at a fashion event to record items associated with multiple models) (Step 230), the process of selecting a new celebrity identity and recording items for that celebrity may be repeated. Otherwise, celebrity admin computing device 105 may remain dormant (Step 230) until there are future events where a celebrity has become associated with an item through purchasing the item or otherwise obtaining it for use.

The resulting database of verified celebrity purchases/item associations may then be consulted in the future for use in identifying items depicted in an image of a celebrity who has been identified but whose items or accessories have not been identified.

Figure 3:
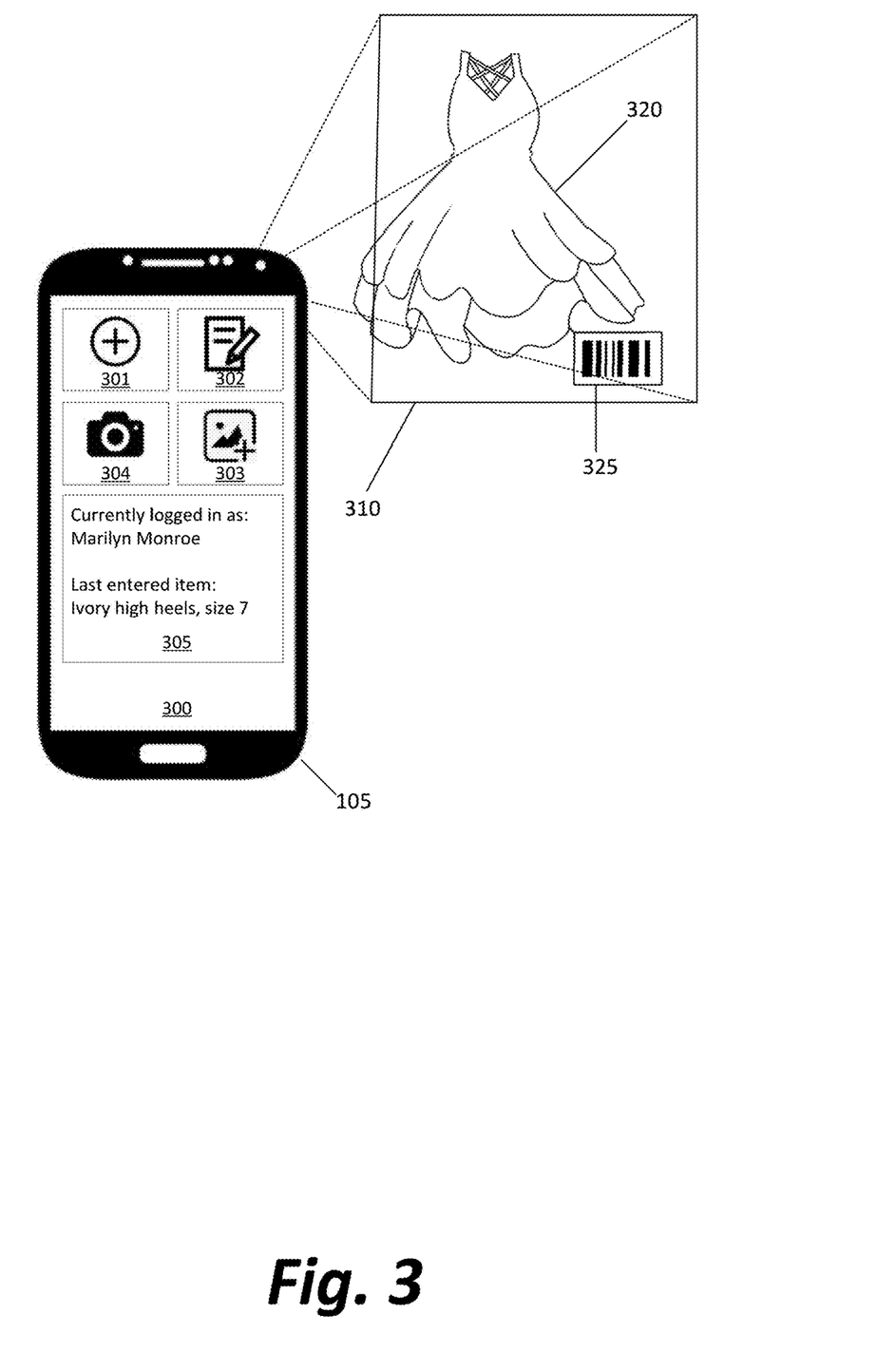
FIG. 3 depicts a simplified example graphical user interface for initiating and managing the method illustrated in FIG. 2.

FIG. 3 depicts a simplified example graphical user interface for initiating and managing the method illustrated in FIG. 2.

A user interface 300 of celebrity admin computing device 105 may include, for example, buttons or other widgets for entering a new celebrity into the system (button 301), manually entering textual information concerning clothing or other purchases (button 302), entering photographic information previously captured such as photographs of barcodes or receipts (button 303), take new photographs to enter information (button 304), and/or other features, such as entering photographic information that shows the clothing or other purchase in use by the celebrity to aid in later identification of the same article. The interface may also display current status information 305, such as the identity of a celebrity with whom items entered using the interface and will be associated, or confirmation that previously entered items have been correctly identified and associated with the celebrity.

In a preferred embodiment, for example, a user may tap button 304 while pointing the field of vision 310 of a camera of celebrity admin computing device 105 at a new purchase 320 having a still-attached tag 325 with a UPC. A bar code scanning software module may process the captured image data, determine the unique UPC of the item, determine the merchant selling the item, and then enable central server 100 to communicate with the merchant's computing device 120 to store both a unique name for the item and a means for a consumer to obtain the item from a merchant.

Figure 4:
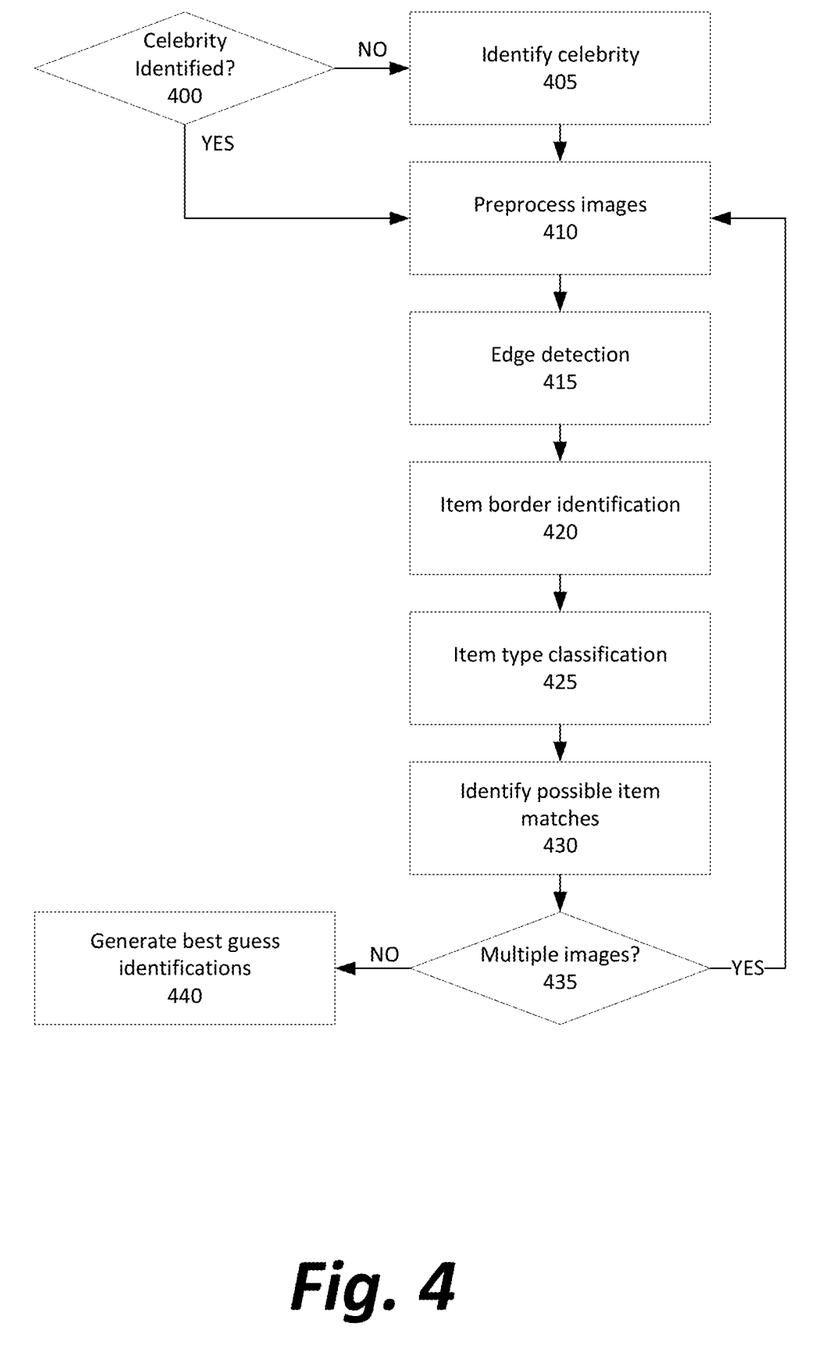
FIG. 4 depicts a method of uploading and processing photographic or video data of a celebrity to recognize clothing captured within the image(s)

FIG. 4 depicts a method of uploading and processing photographic or video data of a celebrity to recognize items captured within the image(s) in use by the celebrity.

If the celebrity is not already identified and provided in conjunction with the image(s) (Step 400) such as in the filename of the image(s) or in a transmission with the images to the central server 100, the celebrity may be identified (Step 405) through the use of facial recognition software, whether commercially available and generic, or an artificial intelligence classifier particularly trained on images of celebrities taken sources including one or more of news organizations, private photographers, fashion magazines, as part of filming a movie, television, or other entertainment. Celebrity identification may also be possible from context without image analysis, such as performing text recognition on a label incorporated into the image(s), or upon other contextual clues such as identification of the location, date, or event depicted in the image.

As a matter of pre-processing, the image(s) may have their color or brightness adjusted (Step 410) based on contextual clues that the lighting under which the image(s) were captured. For example, if lighting is redder or bluer than usual, or dimmer or brighter, the image may be automatically modified to more closely match reference images or qualities that may exist for a given item. Determinations of abnormal coloration or lighting may be determined by, for example, referencing an item or region in the image known to be in reality white, another precisely known color (such as the apparent color within the image of a flag or mineral or other design or substance known to have a particular coloration), or to be reflective, and comparing its apparent coloration in the image with the known true coloring.

Other pre-processing may include blurring or removing irrelevant parts of the background, or, if the images are provided in the form of a video clip, capturing one or more stills in the clip for analysis rather than every frame of the clip.

The image(s) may have edge detection performed (Step 415) to identify boundaries between items and other elements of the image, such as the celebrity's face, other exposed skin of the celebrity, and other persons or background elements depicted in the image. Elements identified by edge detection may then be grouped based on context, such as grouping stripes, folds, polka dots, or other design elements into a single region for later analysis. Ultimately, the image is divided into a set of distinct regions that are likely to be relevant items, instead of persons or other background elements (Step 420).

For each region, a series of steps or classifiers may be performed to attempt to identify the item depicted in that region as one of the items previously entered and stored by central server 100 as associated with the celebrity depicted in the picture.

An artificial intelligence classifier may attempt to identify a type of item depicted in each identified region (Step 425), such as identifying an item as being a shirt, as compared to a shoe or purse. Classification may be performed based on one or more of a number of factors, including a shape of the item's outline, its location on a person (e.g., on a person's head, on their torso, in their hand, on their legs, on a foot, etc.), the gender or age of the wearer, possible signifiers of an item type visible on the item itself (e.g., shoelaces indicating a shoe, buttons indicating a shirt, etc.), or other contextual clues in the background of the image (e.g., that an item is likely a swimsuit if the wearer is in water, or that an item is likely a coat rather than a dress if the wearer is outside in snow).

Once an item type is identified, potential matches with known items of that type associated with the celebrity may be identified (Step 430). Items may be ruled in or out of consideration as a possible match based on a number of factors, including the color(s) of the item, date of photograph/video (any item being obtained by the celebrity only after that date being ineligible), any identified logos, partial text matches with text printed on the item and determined by text recognition on the image, any images depicted on the surface of the item, patterns or apparent materials (e.g., stripes, patterns, presence of fur), other apparent clothing qualities (translucency or transparency of fabric, "flowy" fabric based on how the clothing is reacting to gravity, "puffy" clothing based on a comparison of the clothing outline with the natural outline of a wearer), material reflectivity to the lighting in the image, or any other method of determining the identity of an item.

Items may also be identified by clues external to the image(s) themselves, such as determining that the photo depicts a particular event for which a celebrity's associated items are already known (for example, that the image depicts an award ceremony where a commentator already identified clothing the celebrity would wear to the event, or that another photo was taken the same day and has already been analyzed to determine that the celebrity had the same items).

Each of the different factors or methods of matching or ruling out an item may be steps performed by a single module of software, or may be divided among a number of specialized modules (such as a neural network trained to determine only whether one quality is likely present, and to select only potential items having a determined quality or that do not have a quality determined not to be present) and processed in parallel, with a primary process gathering the results of each module for consideration.

If there are multiple images from a same gallery, video clip, or other entertainment item (Step 435), the method may repeat for any remaining images.

Once all images have been analyzed, guesses for the identity of an item based on each individual analysis may be compared and either ruled out based on lack of confirmation in other images, or confirmed by multiple images all finding the same identification.

For each item region in each image, central server 100 may ultimately determine a "best guess" identification for that item (Step 440), or multiple, ranked "best guess" identifications for that item. The identifications may be assigned a particular level of certainty, so that an interface (such as the one described below) for presenting results of the identification can contextualize how certain the automated system is that an identification is correct.

Additionally, possible identifications may be generated that are not among the known items associated with the celebrity, but are instead identifiable as at least close analogues to items depicted with the celebrity, if not exact matches. For example, even if a particular dress worn by the celebrity is unique because the designer or merchant of that dress has not made it commercially available, there may be another dress with similar cut or coloration that could "pass" as being the same dress to the untrained eye.

Figure 5:
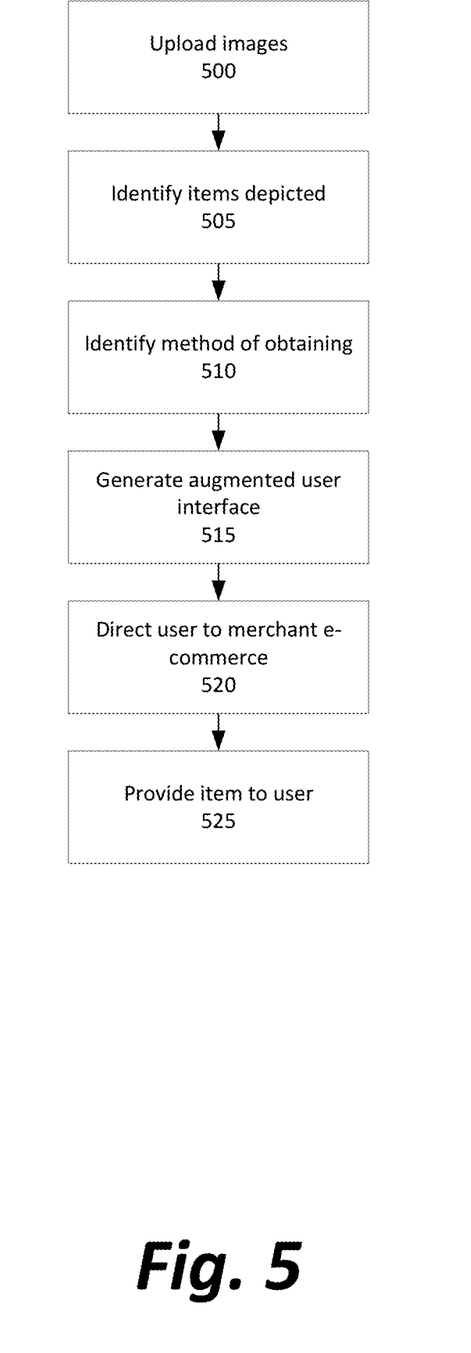
FIG. 5 depicts a method of generating a graphical user interface that annotates a provided image with possible purchase options based on the content of the image.

FIG. 5 depicts a method of generating a graphical user interface that annotates a provided image with possible purchase options based on items depicted within the content of the image.

Initially, a user uploads image(s) of a celebrity to central server 100 or selects from existing photos or video available through content delivery device 130 (Step 500). Direct upload may simply include going to a website provided by central server 100 and selecting files stored on a hard drive of consumer computing device 125, such as a photograph taken by the user, or one saved by the user from an external source. Alternatively, the user may know some external URL hosted by content delivery device 130 and be able to provide that URL to central server 100 so that central server 100 can request images at that URL or contained within a webpage at that URL from content delivery device 130. In other embodiments, the user may have a web browser plug-in or other software that allows the user to select an image, gallery, or video clip while viewing a webpage or streaming a movie that has been served by content delivery device 130, and automatically transmit the selected image, gallery, or video clip to central server 100. If the user is using a smart TV or other computing device to stream video content from a streaming service, the application used for streaming may incorporate a menu option to select a still or clip during streaming to be sent to central server 100.

In some embodiments, the user may never explicitly select any particular image or content, but may instead choose or consent to have a plugin or other application automatically send images currently visible to the user via consumer computing device 125 to central server 100 under particular conditions. Those conditions might include, for example, that the user is viewing a news item about a particular celebrity, that a merchant has paid for ads related to one or more items that appear in a film the user is watching, or that a consumer has a particular profile being targeted by an advertiser.

Additionally, this method of creating an interface may not require the person depicted within the image(s) to be a celebrity who has explicitly participated with populating the database used by central server 100; if a user wishes to obtain items used by a non-participant in the system (such as a photograph of a user's friend, or a photograph of a stranger that the user took in a public place), the central server 100 may nonetheless be able to identify matches or analogues for items depicted in the image(s) and indicate that while the system has no certainty that the person depicted has bought the item identified, the item identified appears to be what the person depicted is using or wearing.

After central server 100 receives the image(s), analysis occurs to attempt identification of any items in use by the celebrity according to the method described in FIG. 4 (Step 505).

For each identified item, a way of obtaining the item or its analogue from a merchant is identified (Step 510). This may include, for example, querying the merchant computing device 120 or database 121 with known information from central server 100's database to determine a URL of an e-commerce site selling the item, the price of the item, any limitations on availability, etc. Alternatively, it may involve simply obtaining contact information of or a physical location of a particular retailer, as well as enough information about a manufacturer, designer, or model number that a user may be able to purchase the item on their own.

An augmented graphical user interface is then generated for consumer computing device 125 wherein for each item, a link to the merchant is provided next to, above, under, or incorporated on top of the image (Step 515). The interface may be generated by central server 100 and code for displaying it transmitted to consumer computing device 125 (for example, as a webpage to be displayed in a browser) or consumer computing device 125 may have a dedicated application that only receives items of data to be displayed within an interface generated client-side.

The links may, in a preferred embodiment, be a visually responsive interface such that navigating a cursor over the link causes the associated item in the image to be highlighted, have a visible border, or otherwise be indicated, and/or navigating a cursor over the item of clothing in the image causes the associated link and identification to be highlighted. In other embodiments, each link may simply have a lead line or arrow pointing to the associated item in the image.

In some embodiments, instead of a link, only an identification of the merchant and identifier of the clothing may be provided, with the onus being on the consumer to contact the merchant and obtain the item.

In embodiments that identify analogous purchasable items in addition to confirmed or nearly-certain matches, one or more links to those analogues may be displayed, denoted as being probably only a look-alike rather than a confirmed match for the item in the image.

The user may use a function of consumer computing device 125 to follow one of the links to the merchant's e-commerce solution (Step 520). For example, the user may click a hyperlink in a web browser operated on a desktop computer, or may operate a cursor using a remote control of a smart TV with web browsing capabilities. The user is then able to obtain the same or analogue item from the merchant through normal purchasing means (Step 525), though with the benefit of having been sent straight to the item without the need for any additional searching on the user's part.

Figure 6:
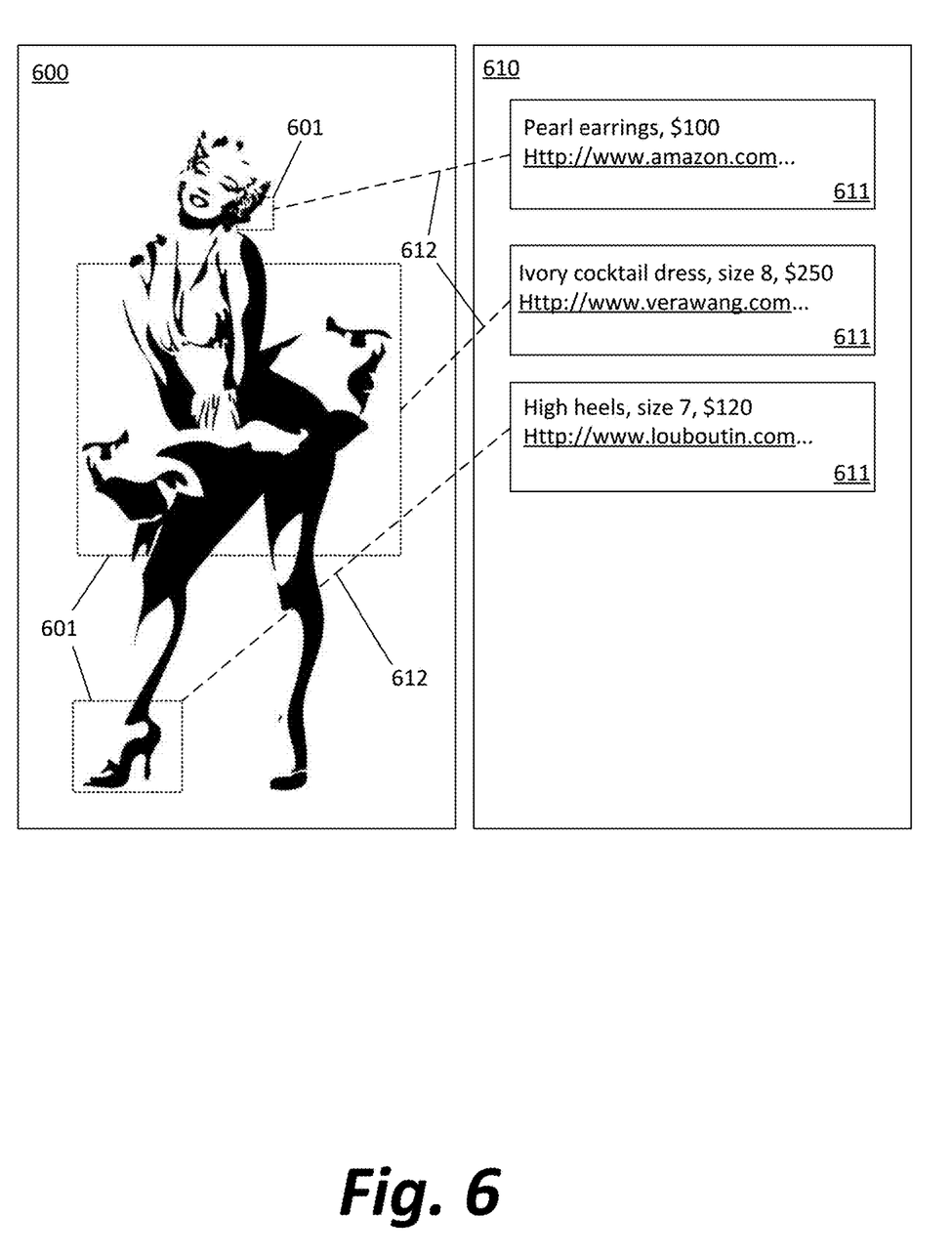
FIG. 6 depicts features of an example graphical user interface for connecting an interested consumer to a merchant selling goods depicted in, or similar to goods depicted in, a provided photo.

FIG. 6 depicts features of an example augmented graphical user interface for connecting an interested consumer to a merchant selling goods depicted in, or similar to goods depicted in, a provided photo.

Region 600 may be used to show an originally uploaded photo or still from a video that was analyzed using the method depicted in FIG. 4. Region 600 may show several subregions 601 that highlight parts of the image that were edge-detected and determined to be items in use by the celebrity. In associated region 610, a number of content sections 611 may be provided that each identify one item of clothing, accessory, or other item within a subregion 601 and link to a confirmed or possible match available from a retailer. Additional information, such as price, material, designer, etc. may also be included if it is present in the database of central server 100, if space permits and/or the user has configured the interface to show the information when available.

For example, for a picture of Marilyn Monroe captured while a user is streaming "The Seven Year Itch" to consumer computing device 125 from content delivery device, as depicted, three link regions 611 may be generated, each pointing to her earrings, her dress, and her high heels, respectively. Lead lines 612 may be generated to connect regions 611 and 601, or as previously described, moving a mouse cursor or other cursor over either portion of the interface may highlight the matching portion of the interface. Link regions 611 may contain hyperlinks to allow the user to go to a particular webpage to purchase the item.

Embodiments according to this disclosure may be directed to concepts other than fashion purchases. For example, other consumer items could be identified from photos or videos, such as vehicles, electronics, food, or furniture which the photos or videos demonstrate that the celebrity has used or consumed.

Figure 7:
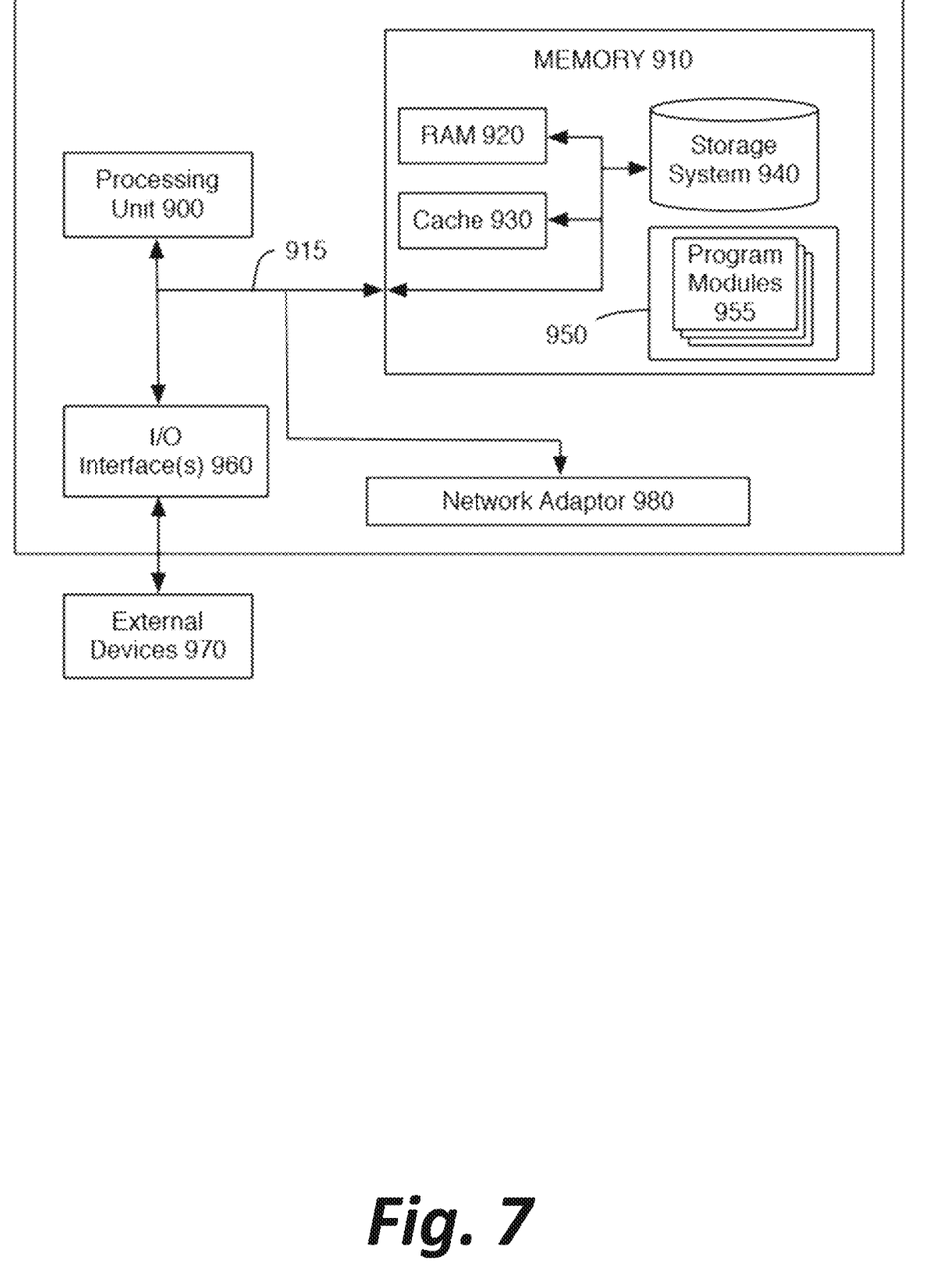
FIG. 7 is a high-level block diagram of a representative computing device that may be utilized to implement various features and processes described herein.

FIG. 7 is a high-level block diagram of a representative computing device that may be utilized to implement various features and processes described herein, including, for example, the functionality of central computing device 100, celebrity administration computing device 105, merchant computing device 120, consumer computing device 125, and content delivery device 130. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. An automated image analysis system, comprising:
  a first computing device comprising memory storing non-transitory instructions that when executed by one or more processors of the first computing device, cause the first computing device to:
    receive, from a second computing device associated with a first human user, a communication indicating that the first human user has selected one or more items for purchase and has purchased the one or more items;

receive, from the second computing device, identifying information of the one or more items and corresponding identifiers of one or more merchants offering the one or more items for sale;

receive, in response to a request from a second human user transmitted by a third computing device, one or more images depicting the first human user using the one or more items;

automatically determine, based on visual characteristics of the one or more images, that the one or more items are depicted in the one or more images wherein the determining comprises determining a necessary color correction to an image based on a difference between a color of the one or more items as depicted in the one or more images and a known color of the one or more items and applying the necessary color correction to the one or more images before analysis to identify the one or more items; and transmit to the third computing device, for display by the third computing device, an automatically generated augmented graphical user interface comprising the one or more images and hyperlinks, wherein the hyperlinks, when followed by the second human user, convey the second human user to a merchant website allowing the second human user to purchase the one or more items from the one or more merchants.

2. The system of claim 1, wherein a fourth computing device stored the one or more images and the request from the second human user caused the fourth computing device to transmit the one or more images to the first computing device.

3. The system of claim 1, wherein the one or more images comprise a video clip.

4. The system of claim 1, wherein automatically determining that the one or more items are depicted in the one or more images comprises dividing the one or more images into regions based on edges detected within the one or more images.

5. The system of claim 1, wherein automatically determining that the one or more items are depicted in the one or more images comprises identifying the first human user as being present in the one or more images using facial recognition.

6. The system of claim 1, wherein automatically determining that the one or more items are depicted in the one or more images comprises identifying a text, logo, or design present in the one or more images which matches a corresponding text, logo, or design of the one or more items purchased by the first user.

7. The system of claim 1, wherein the second computing device is a mobile phone comprising a camera and a screen that displays an item entry interface.

8. The system of claim 1, wherein receiving identifying information of the one or more items purchased by the first human user comprises receiving a photograph of a barcode or of a sales receipt obtained with the one or more items by the first human user.

9. The system of claim 1, wherein the second computing device comprises memory storing non-transitory instructions that when executed by a processor of the second computing device, further cause the second computing device to:

automatically determine, based on visual characteristics of the one or more images, one or more items that visually correspond to items depicted in the one or more images but are not among the one or more items purchased by the first human user; and wherein the automatically generated augmented graphical user interface also comprises hyperlinks that, when followed by the second user, will allow the second user to purchase the one or more items depicted in the one or more images that visually correspond to items depicted in the one or more images but are not among the one or more items purchased by the first human user.

10. The system of claim 1, wherein the instructions, when executed by the one or more processors, further cause the first computing device to:

receive an image depicting a person using an unidentified item that is not one of the one or more items;

automatically determine the identities of one or more commercially available items which visually correspond to the unidentified item and are potential identifications of the unidentified item; and automatically generate an augmented graphical user interface that comprises the image, a visual highlighting of the unidentified item, an informational region that displays the one or more commercially available items, and a link within the informational region to an online store of a merchant from which one of the one or more commercially available items may be purchased.

11. The system of claim 1, wherein the instructions, when executed by the one or more processors, further cause the first computing device to:

receive access to a website shopping cart or online shopping history to obtain the identifying information of the one or more items purchased by the first human user.

12. The system of claim 1, wherein the identifying information of the one or more items comprises a photograph of a bar code.

13. The system of claim 1, wherein the identifying information of the one or more items comprises a photograph of a sales receipt.

14. The system of claim 1, wherein the identifying information of the one or more items is accompanied by one or more reference photographs of the one or more items While in use by the first human user.

15. The system of claim 1, wherein the automatically determining, based on visual characteristics of the one or more images, that the one or more items are depicted in the one or more images comprises identification of an event attended by the first human user during which the one or more images were captured.

16. The system of claim 1, wherein a database for storing identifying information regarding items purchased by users and corresponding identifiers of merchants is updated in real time to include the one or more items and the corresponding identifiers of one or more merchants offering the one or more items for sale in response to the first human user purehasing the one or more items.

* * * * *